C. F. JENKINS.
BALL BEARING.
APPLICATION FILED AUG. 18, 1904.
937,811.
Patented Oct. 26, 1909.
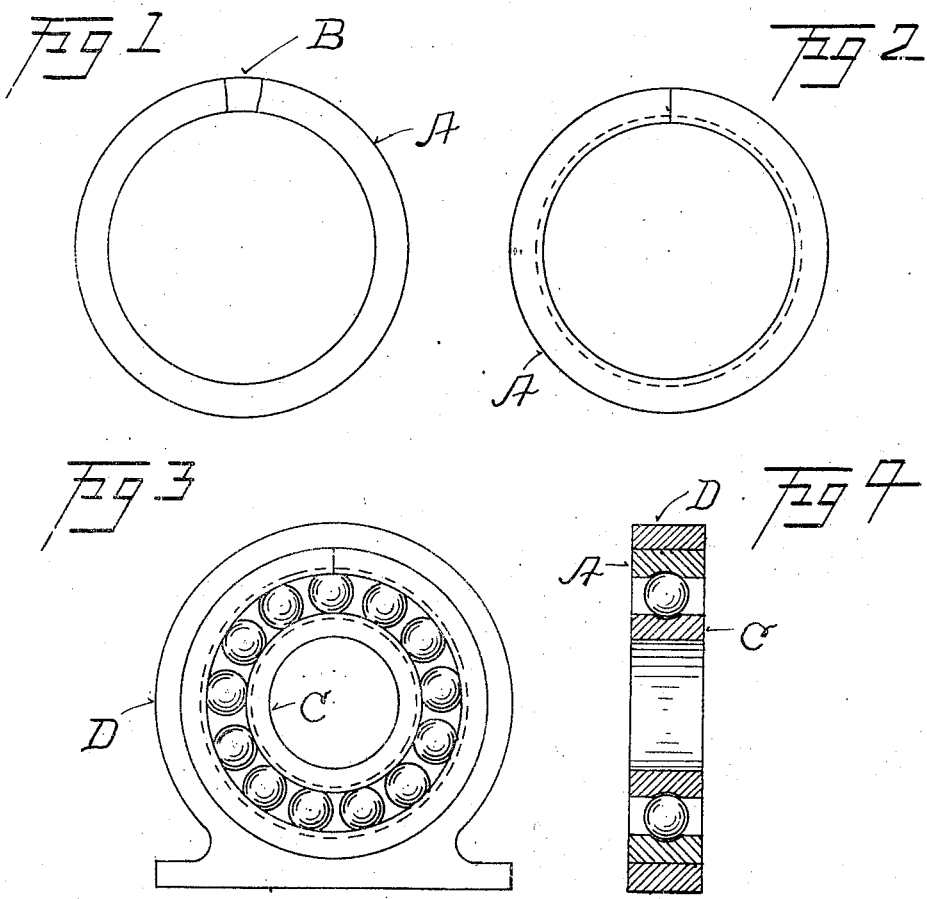

UNITED STATES PATENT OFFICE.

CHARLES F. JENKINS, OF WASHINGTON, DISTRICT OF COLUMBIA.

BALL-BEARING.

937,811.

Specification of Letters Patent.

Patented Oct. 26, 1909.

Application filed August 18, 1904. Serial No. 221,258.

*To all whom it may concern:*

Be it known that I, CHARLES F. JENKINS, of Washington, District of Columbia, have invented a new and useful Improvement in Ball-Bearings, of which the following is a full, clear, and exact description.

This invention relates to that special class of ball-bearings in which are employed two ball races which are always in adjustment.

The principal object of the invention is to secure the simplest possible ball bearing, adapted to be used in multiple for different loads.

It has now come to be very generally conceded that a ball bearing which is properly proportioned to the load it is intended to carry—the balls and the raceways being made of properly hardened steel—will run indefinitely with no perceptible wear. This fact has given rise to simpler bearings, to which class the present invention relates, consisting, as it does, of but two pieces and the balls.

In the accompanying drawings, which disclose the invention, Figure 1 represents a piece of circular steel from which the outside ring of the bearing is made; Fig. 2 the finished outside ring; Fig. 3 a side elevation of the complete bearing in place in the journal box; and Fig. 4 a section of the same.

In the construction of this bearing a steel ring A, of a larger diameter than the finished ring is to be, has a piece B cut out of it leaving a gap therein approximately equal to half the diameter of the balls. This open ring is now hardened and clamped, closed, in a lathe and a groove, forming the ball race, ground therein, as shown by the dotted lines, Fig. 2. A smaller ring, C, Fig. 3, has a corresponding groove ground in its circumference to form the outer race. This completes the bearing, and to assemble it, the inner ring and the outer ring are arranged in the same plane, the former inside the latter. The outside ring is now sprung open and the balls dropped into place filling the space between the two rings. The outer ring now being released returns to its normal semi-closed position, and the bearing can be readily handled without the balls losing out of it.

What I claim as my invention, therefore, is—

1. In a ball bearing, an outer race ring of hardened metal having a segment removed to leave a gap normally approximately equal in width to half the diameter of one of the balls to be used in the race; whereby the hardened ring may be sprung to admit the balls and again sprung to close the gap.

2. In a ball bearing for a circular series of balls in a plane, the combination with an inner ball race, of a series of balls, an outer race ring having at one point a gap normally of a width approximately equal to the half-diameter of one of the balls, and means for holding said gap closed.

CHAS. F. JENKINS.

Witnesses:
D. N. DAY,
W. CLARENCE DUVALL.